UNITED STATES PATENT OFFICE.

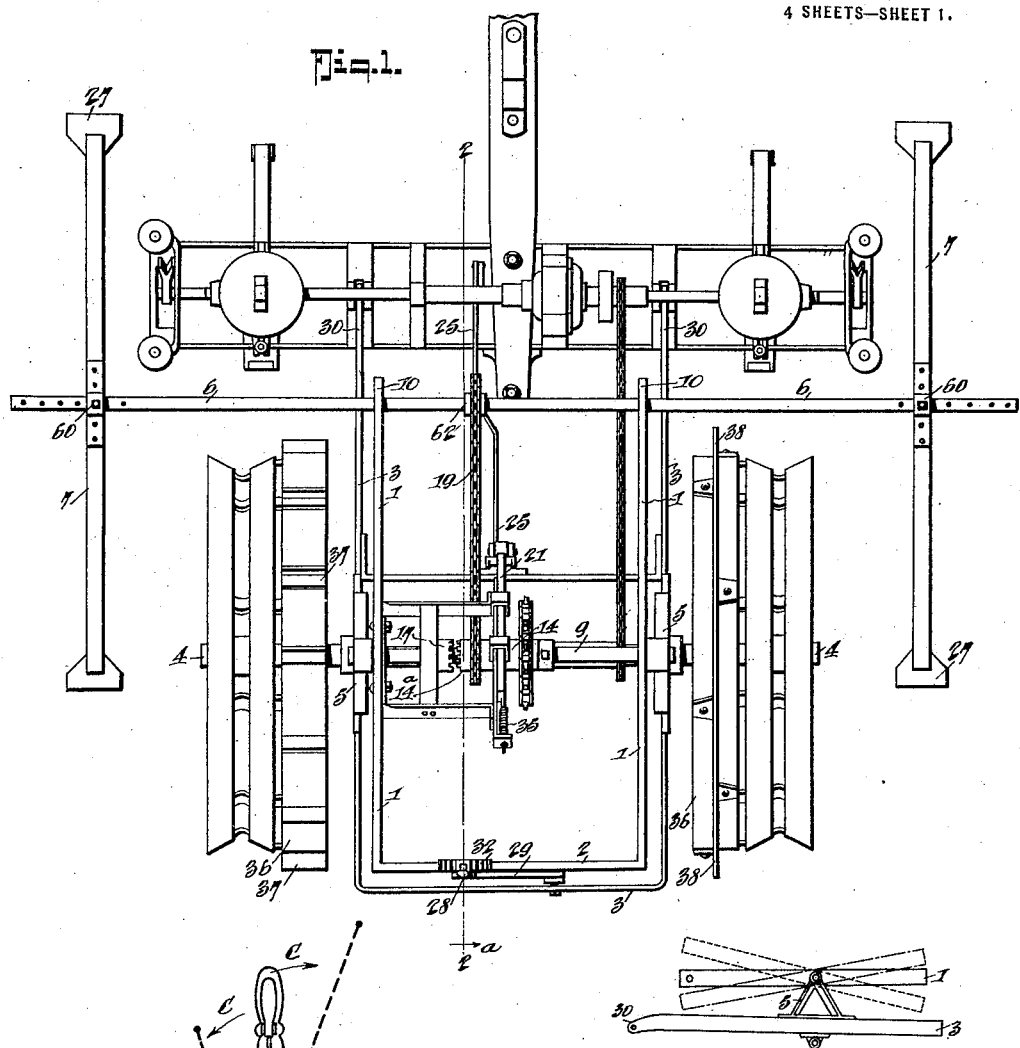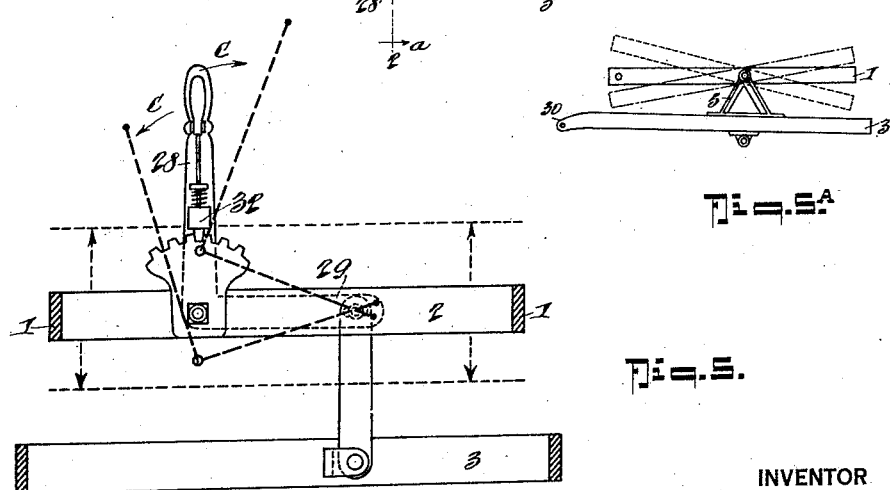

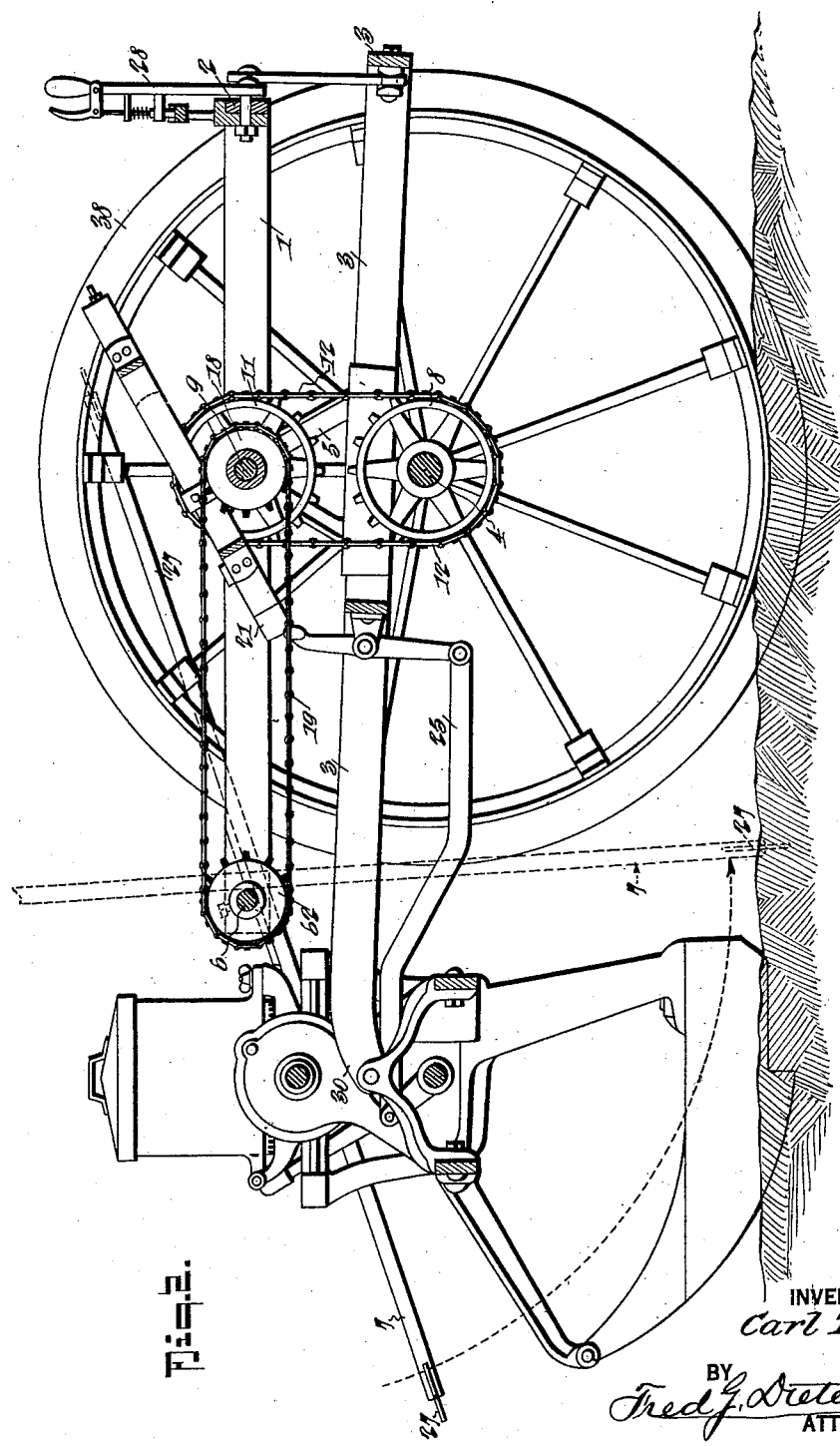

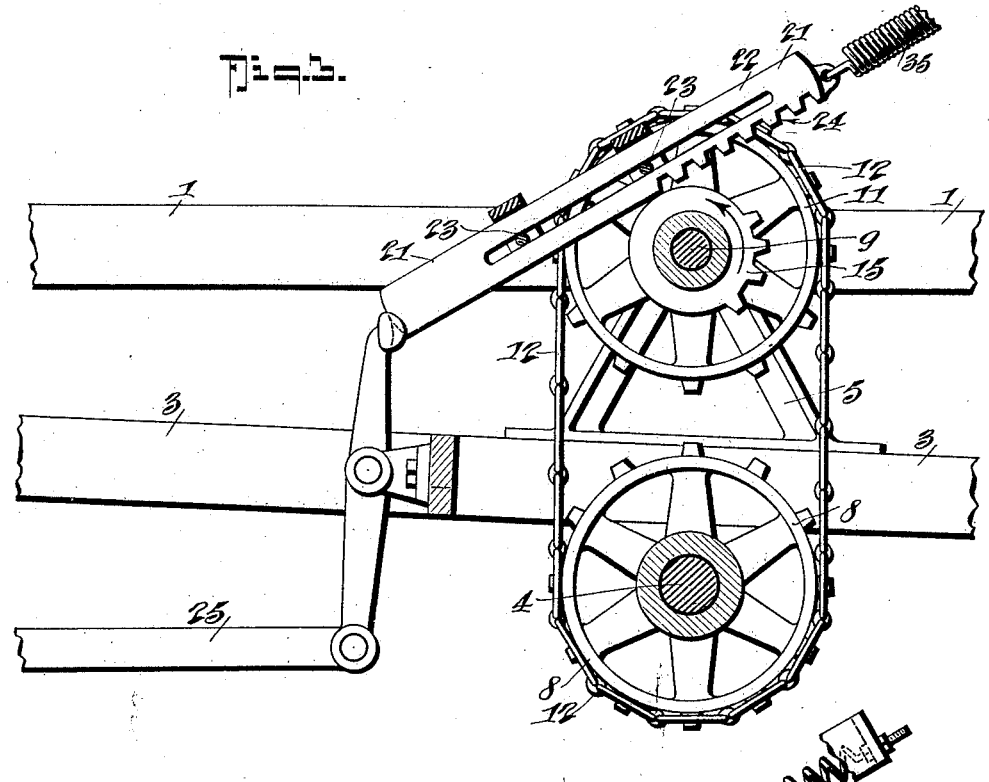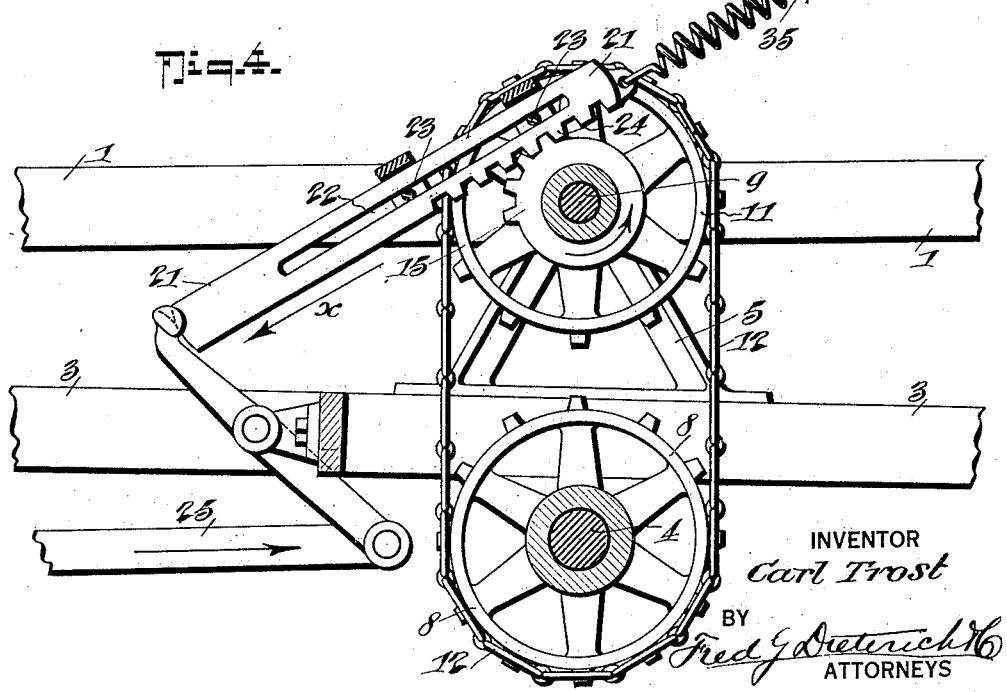

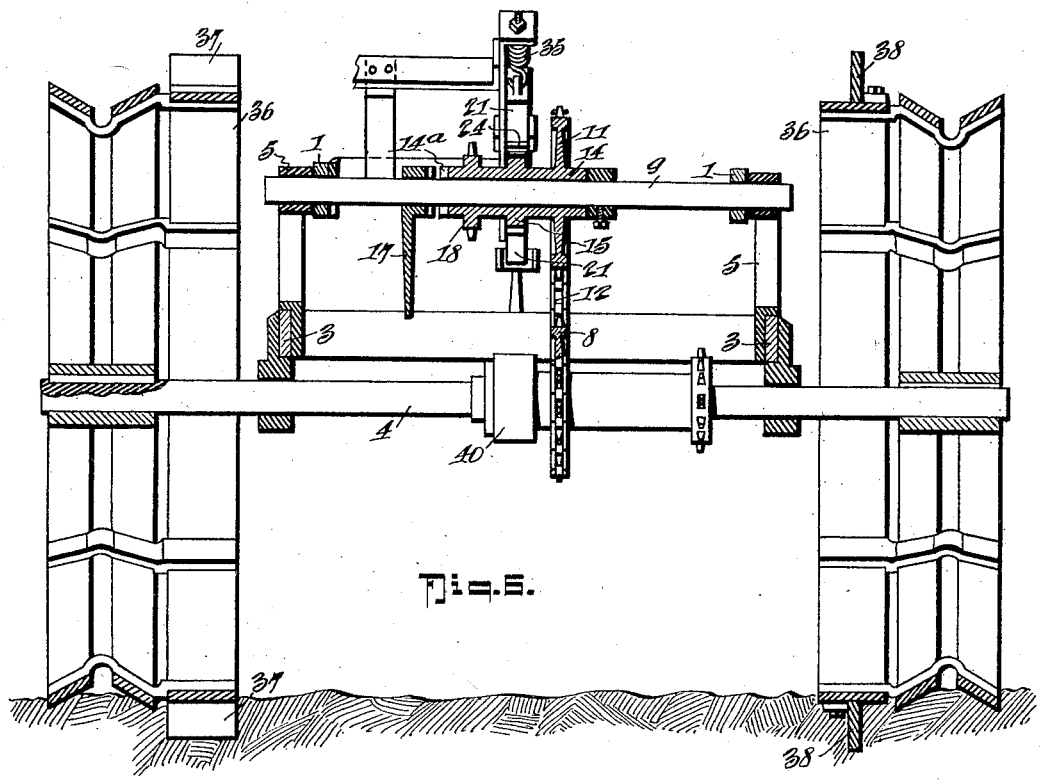
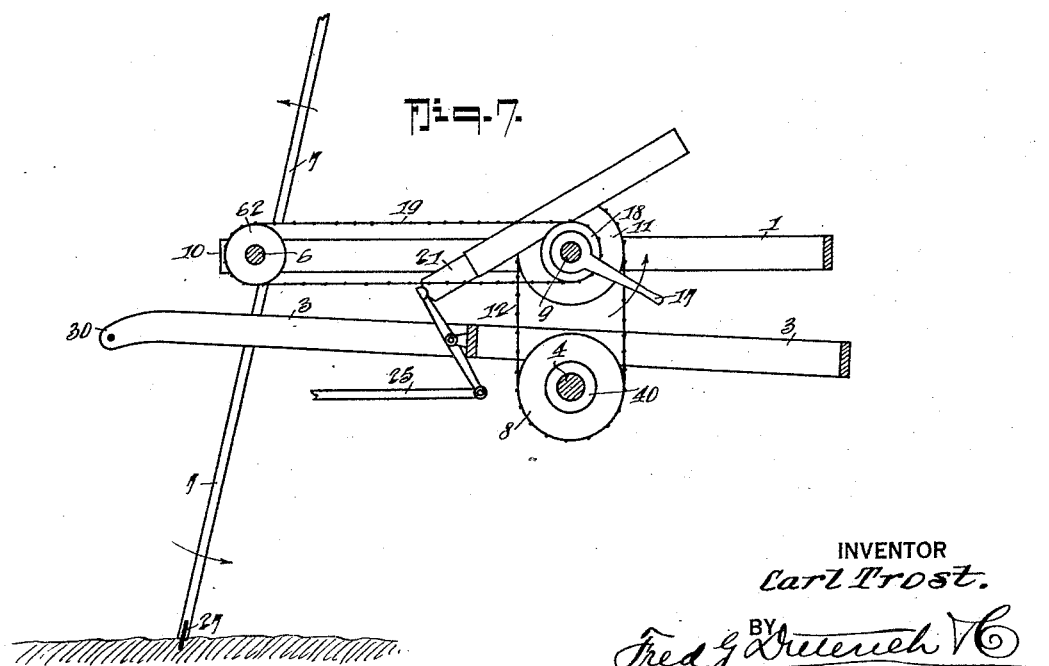

CARL TROST, OF MANNING, IOWA.

ATTACHMENT FOR CORN PLANTERS.

1,408,547. Specification of Letters Patent. Patented Mar. 7, 1922.

Application filed July 2, 1920. Serial No. 393,490.

*To all whom it may concern:*

Be it known that I, CARL TROST, a subject of the United States, (who has taken out first papers, 1917,) at present residing at Manning, in the county of Carroll and State of Iowa, have invented a new and useful Attachment for Corn Planters, of which the following is a specification.

This invention primarily has for its object to provide a new and useful attachment that is especially designed for being combined with any of the conventional types of check row corn planters and which is adapted for working the shaft that controls the seed dropping mechanism without the need of check wires, making the planter, as it were, a wireless one.

Another object of my invention is to provide an attachment of the general character stated, of a simple and economical construction, in which the parts are compactly assembled and which may be readily applied to the ordinary types of check row planters without any material change of the parts thereof and the use of which also provides for marking the ground in order to know where to start, a simple and effectively operating means being also included in the complete make-up of the attachment, for actuating the usual foot drop rod or member that connects with the seed dropping controlled shaft for operating the said shaft, when out of connection with the usual check wire actuating devices.

With other objects in view that will be hereinafter stated, my invention comprises an attachment for corn planters that embodies the peculiar features of construction and novel arrangement of parts fully explained in the following detailed description, as specifically stated in the appended claims and illustrated in the accompanying drawings, in which:

Figure 1 is a top plan view of my attachment, the same being shown as applied on a check row working planter mechanism, the parts being at the normal or at rest position.

Figure 2 is a longitudinal section taken substantially on the line 2—2 on Figure 1 and looking in the direction of the arrow *a*, the foot drop and the foot drop actuating lever devices being indicated at the normal position.

Figure 3 is a detailed longitudinal section, the foot drop and the lever that actuates the said drop being shown in the operative or seed dropper controlled shaft rocking position.

Figure 4 is a view similar to Figure 3 and illustrates the foot drop lever at the seed dropping adjustment.

Figure 5 is a detailed section that illustrates the lever devices for effecting adjustment of the attachment frame to provide for different depths of penetration of the markers as they engage the ground.

Figure 5ª is a diagrammatic view cooperative with Figure 5 and illustrates the adjusted position of the rockable frame, when the adjusting lever is operated, as shown in the said Figure 5.

Figure 6 is a detail central cross section taken through the traction wheels and illustrates the position of the driving devices.

Figure 7 is a diagrammatic view that illustrates the manner in which the seed dropper mechanism may be hand operated as hereinafter further explained.

In the practical development of my invention, the attachment, in its make-up, includes a frame composed of opposite side bars 1—1 and the rear end or cross bar 2, the said frame being of somewhat lesser width and length than that of the ordinary longitudinal or U-shaped frame 3 of the corn planter mounted on the main axle 4 upon which the main or bull wheels of the planter are fixedly attached in the usual manner.

The attachment frame is rockably mounted to tilt in longitudinal and vertical planes on a cross shaft 9 that is journalled in bracket bearings 5—5 bolted as is clearly shown in Figs. 1 and 6, one to each of the side bars of the planter frame 3, mounted on the driving axle 4 and whose front ends 30—30 are attached to the seed box and dropping mechanism supporting framework in the usual way.

6 designates a cross bar that is loosely journalled in the forward ends 10—10 of the frame side bars 1—1 and, at each of its projected ends, the bar 6 carries a marker arm 7, the several arms 7 being adjustable along the said bar 6 and are provided with clamping means 60 for rigidly connecting them to turn with the said bar 6, as motion is imparted to the bar in the manner presently explained.

8 designates the main drive or sprocket gear mounted on the driven axle 4 and 9 indicates a cross shaft, which latter, when my attachment is fitted onto a check row corn planter, is located a suitable distance above the main axle 4.

11 designates a sprocket gear that is integral with a sleeve 14 mounted on the shaft 9, which also carries a mutilated gear 15 and a small sprocket gear 18, which latter, through the medium of a chain 19 drives a like sprocket 62 that is fixedly mounted on the marker carrying shaft 6.

The sleeve 14 and its integral parts above referred to are caused to rotate by reason of the chain 12 that passes over the main sprocket 8 on the shaft 4 and the gear 11 on the said sleeve 14.

The sleeve 14 also has, at one end, a clutch face adapted to be engaged, at times, by a hand operated clutch lever 17, the purpose of which will presently appear.

It is understood that when the usual main clutch devices on the power shaft or axle 4 are out of mesh, no motion is imparted to the gear 11 that transmits power to the mutilated gear 15 and the sprocket transmission 19.

In practice, the cross shaft 9 which carries the mutilated gear carrying sleeve 14 is so positioned on the attachment frame that, when the said frame is operatively applied to the planter frame, it is positioned in an oblique vertical alignment with the foot drop lever devices of the modern type of check row corn planters.

When my attachment is applied to the ordinary check row corn planter, provision is made for automatically actuating the foot drop lever device for transmitting the required motion to the shaft that controls the operation of the seed dropping mechanism and also for making a mark each time the foot drop lever is actuated, the latter operation being explained as follows:

Mounted in suitable guides adjacent the mutilated gear 15 is what I term a foot drop rod, since the said rod automatically actuates, at predetermined times, a foot drop lever 21 which connects with the drill and check row seed feeding devices in a manner similar to working the same under leg and foot action, as is usually done.

Referring now particularly to Figures 3 and 4 of the drawings, it will be observed that the foot drop lever 21 has a vertically elongated slot 22 through which pass guide and limit cross pins 23—23, and, at one edge, the said rod has a gear surface 24 with which the teeth of the mutilated gear 15 engage, during its rotation.

By reason of the peculiar arrangement of the slotted drop lever 21 and its cooperative rack connection 24 with the mutilated gear 15, as motion is imparted to the planter, the power transmitted from the main axle or shaft 4 is carried to the sleeve 14 on the cross shaft 9 and through the mutilated gear 15 to the drop lever 21.

The transmitted power applied to the said sleeve 14, during each complete revolution of the shaft, causes the mutilated gear 15 to force the foot drop rod or lever 21 down, in the direction of the arrow $x$, and in doing so, it actuates the foot lever devices, pulls the dropper actuating member 25 and thereby imparts rotation to the dropping mechanism controlling shaft and effects the operation of the check row or drill feed devices in a manner well understood by those skilled in the art to which this invention belongs.

As motion is transmitted to the hub and the mutilated gear 15, as before mentioned, rotation is imparted to the cross shaft 6 mounted in the forward end of the attachment frame and which carries the marker devices at each of its opposite ends, as before mentioned.

In each of the opposite ends of the marker arms 7 is secured a marker blade 27, as shown.

To provide for causing the markers to dig into the ground, either shallow or deep as may be desired, means is provided for tilting the attachment frame on its pivotal bearing, which means is preferably in the nature of a hand lever 28 that is fulcrumed at its lower end on the rear cross bar 2 of the attachment frame 1, see Figures 2 and 5, and at the said lower or pivoted end, the lever 28 has a laterally extended crank 29 which flexibly joins with the rear cross bar of the planter frame 3 and in such manner that, as the lever 28 is swung in the opposite directions (see arrows $c$—$c$ on Figure 5), the attachment frame is tilted to raise and lower the front end thereof to thereby hold the markers for engaging the ground, either under a light or a heavy pressure, as they are rotated during the process of seed dropping.

To hold the attachment frame to any of its tilted adjustments, the lever 28 and its pivotal support is provided with the usual form of ratchet and pawl devices 32, as clearly indicated in Figure 5.

It is understood that, during each rotation of the cross shaft 9 and the mutilated gear, the foot drop lever, after it has performed its function of depressing the pedal for working the foot drop devices that join with the seed dropping shaft, as before mentioned, and as is clearly shown in the drawings, the said drop lever is restored to its upper or pulled back position by a suitable spring 35, ready for being again engaged by the mutilated gear 15 for again operating the dropping mechanism controlling shaft.

For stabilizing the machine, as it travels along the field with my attachment operatively applied, one of the bull wheels is preferably provided with an annular rim 36 having crosswise penetrating blades 37 and the bull wheel, at the other side, equipped with an annular rim having a radial fin 38, as shown in Figure 1.

In order to insure the preferred uniform planting of a field, when using my improved attachment, I employ the following mechanism thereon and, by its use, one may make the necessary turn at the end of the field and, by hand operated means, so set the mechanism as to cause the same to drop the seeds in perfect alignment with the rows already planted.

As before described, one end of the loosely mounted sleeve 14, which carries the sprocket gears 18 and 11, has a clutch face 14ª which is adapted to be engaged by the clutch lever 17, when it is desired to "hand set" the mechanism for reasons stated above.

By referring to the foregoing description and particularly to Figures 6 and 7 of the drawings, it will be readily seen that by moving the loosely hanging lever 17 into clutch engagement with the sleeve 14, assuming that the clutch 40 has been thrown out of engagement, the same may be hand turned to cause the seed to drop at a determined point as soon as the driving mechanism is again thrown into operation.

It is understood that the detailed arrangement of the parts, as shown in the drawings, are illustrative of an operative relation of my attachment in connection with a well known type of check row seed planter mechanism and it is obvious that, in the practical development of my invention, numerous modifications and changes in the details of structure may be made without departing from the essentials of the invention as comes within the scope of the appended claims.

From the foregoing description taken in connection with the drawings, it is believed the complete construction, the manner in which my improved atachment may be readily applied to the conventional type of check row corn planters, and the advantages thereof will be readily apparent to those skilled in the art to which my invention relates.

What I claim is:

1. An attachment for planters which are provided with the usual foot operated dropping devices; the said attachment comprising a reciprocating bar adapted to operatively engage a part of said foot operated dropping devices to actuate the same, and means for reciprocating said bar to effect intermittent operation of the dropping devices.

2. An attachment for planters having the usual foot operated dropping devices, said attachment comprising a reciprocating bar adapted to operatively engage a part of said foot operated dropping devices to actuate the same, means for reciprocating said bar to effect intermittent operation of the dropping devices, said last named means comprising a power transmitting and translating connection between the drive axle of the planter and said reciprocating bar whereby the rotary motion of the axle is transmitted and translated into reciprocating motion in the bar.

3. An attachment for planters having the usual foot operated dropping devices, said attachment comprising a reciprocating bar adapted to operatively engage a part of said foot operated dropping devices to actuate the same, means for reciprocating said bar to effect intermittent operation of the dropping devices, said last named means comprising a rotatable shaft and a multilated gear and rack connection between such shaft and said reciprocating bar for imparting motion to said bar in one direction and means for retracting said bar at intervals.

4. An attachment for cooperation with the usual foot operated dropping devices; said attachment comprising a reciprocating rack bar, a guide for said bar with which said bar has pin and slot connection, a spring for retracting said bar, a rotating shaft with mutilated gear engaging said rack bar to impart intermittent motion to said rack bar against the tension of said spring.

5. An attachment for planters provided with the usual foot operated dropping devices; the said attachment comprising a reciprocating bar adapted to operatively engage a part of said foot operated dropping devices to actuate the same, and means for reciprocating said bar to effect intermittent operation of the dropping devices, said means including a rotating member with multilated gear and a rack bar cooperating with said gear and a handle member, with clutch connection for engagement with said member that has the multilated gear, for imparting motion thereto.

CARL TROST.